Sept. 9, 1952   A. M. ROHN   2,609,699
NOISELESS SHEAVE
Filed Nov. 15, 1948
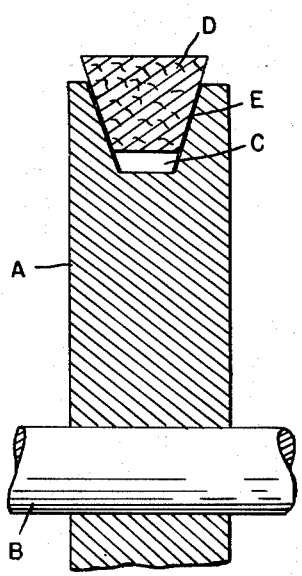
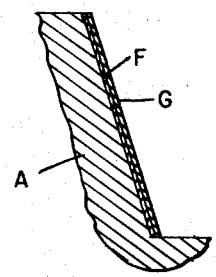
INVENTOR.
ABBOTT M. ROHN
BY
Whittemore Hulbert & Belknap
ATTORNEYS Patented Sept. 9, 1952

2,609,699

UNITED STATES PATENT OFFICE 2,609,699

NOISELESS SHEAVE

Abbott M. Rohn, Detroit, Mich.

Application November 15, 1948, Serial No. 60,166

4 Claims. (Cl. 74—230.5)

The invention relates to sheaves or pulleys designed for use in friction belt transmissions.

It is the object of the invention to obtain a construction which eliminates the noise or squeal which is a frequent accompaniment to the operation of friction belt transmissions. To this end the invention consists in a sheave or pulley having a coating on the belt-engaging surface thereof which lessens the generation of noise vibrations.

The invention further consists in a construction in which the belt-engaging surface has a coating containing cadmium.

The invention is applicable to different types of pulleys, but is especially useful with sheaves or pulleys having belt-receiving grooves. Such construction is illustrated in the drawings in which Fig. 1 is a section through a portion of a grooved sheave and the belt engaging the groove;

Fig. 2 is an enlarged section of a portion of the belt-receiving surface illustrating the coating applied thereto.

In belt and pulley transmissions, there is always a slight unavoidable slippage between the contacting surfaces of belt and pulley, especially where there is a change in load. This frequently causes an objectionable noise or squeal. Such noise can be lessened if the contacting surfaces are lubricated, but such lubrication is objectionable in that it decreases the capacity for power transmission. I have discovered that a coating of the belt-engaging surface with cadmium or cadmium alloy will largely eliminate the generation of noise vibrations. Also that the belt may be run dry over such surfaces and with negligible loss in power transmission.

As illustrated in Fig. 1, A is a sheave mounted upon a shaft B and having a groove C of V-shaped cross section in its peripheral surface. D is a belt of corresponding V-shaped cross section for engaging said groove. E are coatings of cadmium or cadmium alloy applied to the opposite surfaces of the V-shaped groove in the pulley. These are preferably formed by electrolytic deposition, but other methods such as chemical precipitation or hot dip may be used. The thickness of the coating may be varied, as for example, between 0.0005 and 0.005 inch. In some cases it may be desirable to have a preliminary coating of some other metal such, for instance, as nickel F, Figure 2, covered with a coating G of cadmium or cadmium alloy.

With the construction as described any slippage which occurs between the belt and the contacting surface of the pulley will be essentially uniform and therefore will not generate noise vibrations.

What I claim as my invention is:

1. A pulley for friction belt transmissions having an adherent coating on the belt-engaging surface thereof chiefly cadmium.

2. A grooved pulley for engaging a corresponding belt having on the opposite surfaces of the groove an adherent coating chiefly cadmium.

3. A pulley having a V-shaped peripheral groove therein for engaging a belt of a corresponding cross section, the opposite surfaces of the groove having each an adherent coating chiefly cadmium.

4. A pulley having a V-shaped peripheral groove therein for engaging a belt of corresponding cross section, the opposite surfaces of said groove having an under coating of nickel and a super coating chiefly cadmium.

ABBOTT M. ROHN.

REFERENCES CITED

The following references are of record in the file of this patent:

UNITED STATES PATENTS

| Number | Name | Date |
|---|---|---|
| 137,270 | Whipple | Mar. 25, 1873 |
| 754,960 | Bauer | Mar. 22, 1904 |
| 1,383,174 | Udy et al. | June 28, 1921 |
| 1,792,733 | De Wein | Feb. 17, 1931 |
| 2,040,282 | Swartz | May 12, 1936 |
| 2,139,622 | Lonskey | Dec. 6, 1938 |
| 2,184,545 | Collier | Dec. 26, 1939 |